Oct. 27, 1953  A. D. RICHARDSON  2,657,358
VARIABLE FREQUENCY RESPONSE GALVANOMETER
Filed Dec. 10, 1948
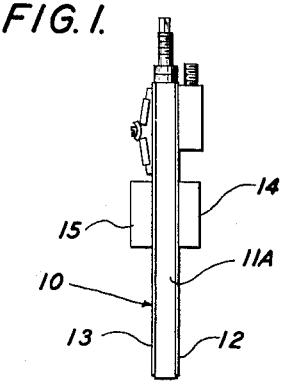
FIG. 1.
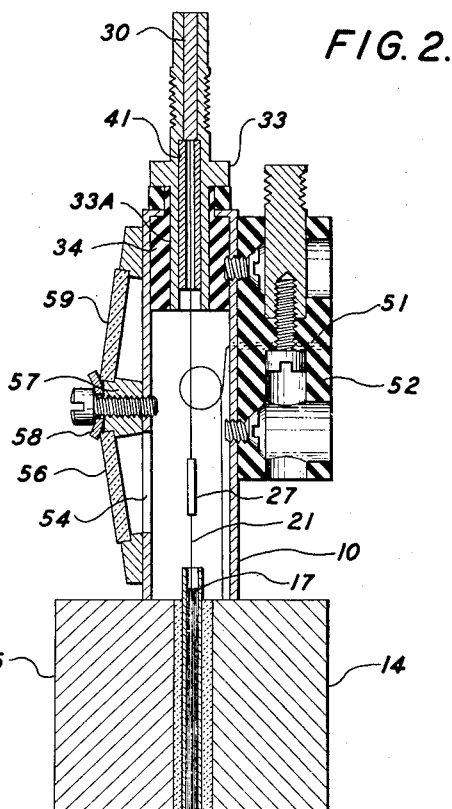
FIG. 2.
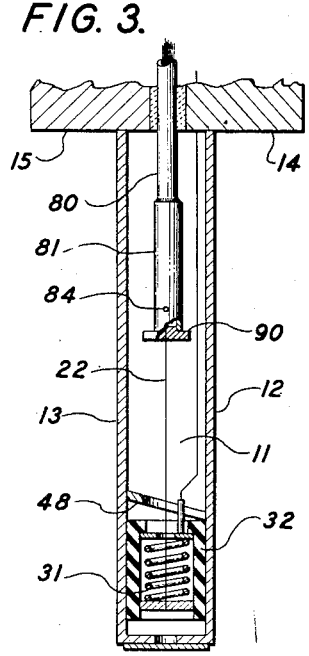
FIG. 3.
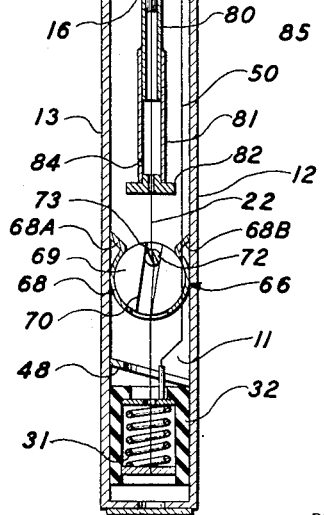
INVENTOR.
ARTHUR D. RICHARDSON
BY
James B. Christie
ATTORNEY Patented Oct. 27, 1953

2,657,358

UNITED STATES PATENT OFFICE 2,657,358

VARIABLE FREQUENCY RESPONSE GALVANOMETER

Arthur D. Richardson, Pasadena, Calif., assignor to Consolidated Engineering Corporation, Pasadena, Calif., a corporation of California Application December 10, 1948, Serial No. 64,677

14 Claims. (Cl. 324—125)

1

This invention relates to galvanometers of the type adapted to respond to alternating or oscillating voltages.

In my copending application Serial No. 673,111, filed May 29, 1946, an improved galvanometer of the above type is described and illustrated. In my copending application, Serial No. 14,789, filed March 13, 1948, I disclose a frequency controlling device adapted for use in galvanometers of this type. The present invention relates to improvements in such a galvanometer for damping the vibrating system to substantially eliminate the natural period thereof. The damping means of the present invention may be used in the improved galvanometer as described in my copending application or in substantially any galvanometer of this type with or without the aforementioned frequency controller. However, best results are obtained when the damping means is used in conjunction with frequency control means.

A galvanometer, constructed as described in copending application Serial No. 673,111, comprises an extremely light weight fine wire coil held in suspension by a pair of stretched wires anchored at opposite ends of a small rectangular casing and comprising the axis of rotary motion of the galvanometer coil. A pair of pole pieces are disposed in close association with the coil and extend beyond the side of the case for engagement by a suitable magnet.

The damping means in accordance with the present invention comprises a tubular member disposed around the coil and extending beyond the coil in both directions. The upper end of the tubular member is open and the lower end is sealed around the lower suspension wire. The damping sleeve is filled with a fluid of an appropriate viscosity-temperature co-efficient for the frequency of the particular instrument.

As above indicated the damping sleeve of the present invention is particularly useful when employed in conjunction with the frequency control means described in application Serial No. 14,789. This frequency controller comprises a curvilinear leaf spring adapted to fit snugly within the galvanometer case beneath the coil and slideable therein. A solid disk is rotatably held in the spring and a cylindrical insert is rotatably mounted in the disk, the disk and insert being slotted to permit passage of the suspension wire therethrough. By means of this apparatus the effective free length of the lower end of the coil suspension wire may be altered by rotating the insert with respect to the disk so as to crimp the

2 wire between the opposite ends of the insert slit and moving the spring-disk assembly lengthwise in the case. The suspension wire is centered by rotating the disk within the spring.

When using the damping sleeve of the invention in the absence of the frequency controller, the lower end of the sleeve is sealed by a rigid plate through which the suspension wire passes. The frequency of the instrument is thus established by the location of this plate. When the damping sleeve is used in conjunction with the frequency controller the lower end thereof is sealed with a flexible membrane or cap which, although having an effect on the frequency, does not definitely determine the same as a function of the location of the membrane. The frequency controller is useful in the assembly of the instrument to determine the correct location of the sealing membrane, and in the assembled instrument to fix the frequency thereof.

A feature of the invention is the construction of the damping sleeve which comprises two telescoping tubes. In assembling the apparatus the lower tube is adjusted longitudinally to the correct position with respect to the desired frequency and is thereafter affixed to the upper sleeve. When the diaphragm is sealed across the open end of the adjusted lower tube, it will be in the proper position to establish the desired frequency or to cooperate with the frequency controller to establish the desired frequency.

The damping means of the invention together with the methods of use thereof will be more clearly understood from the following detailed description taken in relation to the accompanying drawings in which:

Fig. 1 is an elevation view of a galvanometer of the type described in my aforesaid copending application;

Fig. 2 is a sectional elevation of the galvanometer of Fig. 1 showing the position of the damping sleeve and the frequency controller; and Fig. 3 is a sectional elevation of the lower portion of the galvanometer showing a modified form of damping means particularly adapted to be employed in the absence of a frequency controller.

The galvanometer shown in elevation in Fig. 1 and sectional elevation in Fig. 2 is substantially similar to the instrument described and illustrated in the aforementioned copending applications and comprises a casing 10 in the form of a square or rectangular prism the length of which is many times greater than its cross sectional dimensions. The casing comprises an elongated back piece 11, two sides 12 and 13 and a cover 11A which may be removed to expose the inside of the instrument.

A pair of pole pieces 14, 15 are mounted through the sides 12, 13 respectively of the casing and define a gap 16 aligned on the longitudinal axis of the case. The pole pieces extend outwardly from the case where they are connected to a magnet (not shown).

There is suspended in the gap 16 between the pole pieces, an elongated coil 17 of fine wire shaped to occupy a very small cross-sectional area. The coil 17 is composed of fine insulating wire, such as No. 48 enameled or even finer. The winding is preferably done in such a manner that the coil is substantially cylindrical in form with a circular cross section. Wires forming this coil are preferably cemented together so that the coil maintains a rigid self-supporting form.

For the purpose of suspending the coil in position in the gap 16 there are provided thin suspension wires 21, 22 at each end of the coil. These suspension wires are looped through the coil and the ends of the fine wire forming the coil 17 are brought out loosely and preferably are looped around respective loops of the suspension wires 21, 22, thereby making the wires 21, 22 in effect, the terminals of the coil.

The wire 21 has attached to it above the coil 17 a small rectangular mirror 27. The means of mounting the mirror 27 on the suspension wire 21 is described in detail in application Serial No. 673,111. For the purpose of suspending this mirror and coil assembly centrally within the casing, a wire holding member 30, in the form of a cylindrical rod, is mounted at the upper end of the case and the wire 21 is affixed thereto. A compression spring 31, held within an insulator portion 32, is mounted in the other end of the case and the wire 22 is hooked to the spring.

The wire holding member 30 is mounted through a bushing 33 and means are provided for centering the suspension wire and coil on the longitudinal axis of the case. The entire mounting assembly is insulated from the case by an insulating bushing 34. The illustrated mounting means is described in detail in my above mentioned copending application Serial No. 673,111.

The end of wire 22 is soldered to a hook (not shown) extending above the spring 31. For the purpose of holding the spring assembly in a proper position within the end of the casing, there is provided a holding member 48 in the form of a horseshoe. This is wedged within the casing so that it bears against the sides thereof, and the tendency of the spring to expand pushes the inner end of the bushing 32 against the wedged end of the member 48 so that it maintains its position.

The length of wire 22 is such that when the aforementioned hook is hooked over the end loop of spring 31, the spring is compressed somewhat against member 32 so that wires 21, 22, are stretched with substantial tension. The hook (not shown) is of electrical conducting material making contact with the spring 31 thereby putting the spring in circuit with the galvanometer coil. A suitable connecting wire 50 is soldered at the inner end of the spring 31 and is lead through the galvanometer casing past the pole pieces 14, 15. The wire 50 is carried through the side 12 of the casing through an insulating bushing 51 into the interior of a terminal casing 52.

When the galvanometer is assembled, the mirror 27 is located adjacent an opening 54 in the wall 13 of the case. The reflecting surface of the mirror is faced towards the opening so that light will shine on the mirror and be reflected back through the opening. A suitable lens 56 is held in juxtaposition to the opening. The lens may be held in a lens holder 57, the latter being rotatable about a pivot 58. The lens holder may carry a second lens 59 which may be brought into alignment with the opening 54 if desired.

As described the galvanometer has a substantially fixed frequency determinable by the length of the combined suspension wires 21, 22 and the coil 17 between the points of contact of the respective suspension wires with the mounting means at the upper and lower ends of the case. The frequency controller 66, described in my copending application Serial No. 14,789, is adapted to be incorporated in the galvanometer as described and may be manually operated to adjust the frequency thereof over a comparatively wide range.

Briefly the frequency controller comprises a leaf spring 68 substantially circular in plan and having legs 68A, 68B projecting outwardly therefrom to bear against thte walls of the galvanometer 8. A disk 69 is rotatably held within the confines of the spring 68 and has a diametric slot 70 cut in a face thereof. The disk 69 is countersunk at a point in the slot to hold an insert 72 rotatably therein. The insert 72 is also provided with a diametric slot 73. The suspension wire 22 is led through the slot 73 in the insert 72 and through the slot 70 in the disk 69. The frequency controller is positioned in the case as desired and the insert 72 is twisted so that the suspension wire 22 is crimped between opposite edges of the slot 73. The disk is rotated to center the suspension wire above the insert. The frequency of the galvanometer is determined by the location of the upper point of contact between the suspension wire 22 and the insert 72.

The damping sleeve of the present invention comprises a tube 80 rigidly mounted in the housing between the pole pieces around the coil 17 and extending past the coil in both directions. A sleeve 81 is mounted on the lower end of the tube 80 and is closed at its lower end with a flexible diaphragm or plate 82 through which the wire 22 is sealed. A small port 84 in the lower end of the sleeve 81 provides means for filling the tubes 80, 81 with a suitable fluid by means of a hypodermic needle or the like.

As mentioned above, the diaphragm 82 is sealed to the wire 22, but being flexible does not definitely fix the frequency of the instrument. However, the diaphragm does have an effect on the frequency inasmuch as it impedes vibration of the wire 22 at the point of contact. In assembling the damping sleeve in the apparatus, the sleeve 81 is free to slide on the tube 80. The frequency controller 66 is adjusted to the approximately correct position for establishing the desired frequency of the instrument before the lower end of the tube is sealed. This point is designated by a mark on the case or the like. The frequency controller is moved and the sleeve 81 is adjusted on the tube 80 so that the lower end thereof coincides with this predetermined point and is sealed to the tube in this position. The sleeve 81 may be affixed to the tube 80 by placing a suitable cementing compound around the upper edge of the sleeve, as at 85. The flexible diaphragm 82 is then cemented on the end of the sleeve and sealed to the wire 22. Final determination of the frequency of the instrument is obtained by adjusting the positioning of the frequency controller 66 below the diaphragm 82. Thereafter, the damping sleeve is filled by injection through the port 84, with a fluid having a suitable viscosity temperature co-efficient.

The character of the fluid injected in the damping sleeve is determined as a function of the desired frequency of the instrument. Thus for a frequency of approximately 100 cycles per second it may be desirable to use a damping fluid having a viscosity-temperature-co-efficient of about 135 centistokes. For an instrument having a frequency of approximately 3300 cycles per second a fluid having a viscosity-temperature-co-efficient of approximately 1100 centistokes is appropriate. For frequencies intermediate this range the character of the damping fluid should should be altered accordingly. The viscosity-temperature-co-efficient of the damping fluid to be used in any galvanometer can be calculated with a fair degree of accuracy from the following equation:

$$X = \frac{y + 347}{3.32} \quad (1)$$

where $X$ = viscosity-temperature-co-efficient, and
$y$ = the frequency of the galvanometer The frequency and viscosity co-efficient range established by Equation 1 does not constitute a limitation of the invention. The relationship indicated is that which I have found to be satisfactory, but not necessarily essential.

Referring to Fig. 3 a modification of the apparatus is shown which is adapted for use without the frequency controller. The galvanometer shown in partial section in Fig. 3 is identical to that shown in Fig. 2, and like parts are designated by like numerals. In this embodiment the telescopic sleeve 81 of the damping sleeve is employed to fix the frequency of the instrument. This is accomplished by sealing the lower end of the sleeve 81 with a rigid diaphragm or cap 90 which bears against the suspension wire 22. In this manner the contact of the wire 22 with the rigid cap 90 determines the frequency of the instrument in the same manner that contact of the wire 22 with the frequency controller 66 (Fig. 2) establishes the frequency.

In assembling the apparatus of Fig. 3 positioning of the sleeve 81 with respect to the tube 80 is accomplished by trial and error until the correct frequency is established with the suspension wire 22 bound at the lower end of the tube 81. When the correct position has been established the tube 81 is cemented to the tube 80 in the manner above described and the rigid diaphragm or cap 90 is cemented to the lower end of the tube and to the suspension wire 22. Thereafter, the damping sleeve is filled with appropriate fluid through the port 84.

Although the apparatus of Fig. 3 represents the simplest embodiment of the invention, the apparatus of Fig. 2, wherein the damping sleeve and frequency controller are employed in conjunction with each other, has the advantage of ease of adjustment and of assembly. Thus, as indicated above some difficulty is encountered in fixing the exact position of the sleeve 81 in the apparatus of Fig. 3, having in mind that the rigid diaphragm or cap 90 will and must determine the frequency of the instrument. On the other hand the flexible diaphragm 82 on the lower end of the sleeve 81 on the apparatus of Fig. 2 does not definitely determine the frequency of the instrument which may be simply determined by adjustment of the controller 66. For this reason any error in the location of the diaphragm 82 can be compensated for by adjustment of the frequency controller.

In either of the embodiments, the telescoping nature of the damping sleeve has the advantage of permitting the use thereof with galvanometers of any desired frequency. The sleeve may be adjusted in overall length so as to permit operation at the desired frequency. Furthermore, the apparatus can be assembled and the frequency established by actual test before the sleeve 81 is sealed to the tube 80, and before the lower end of the sleeve 81 is sealed. Thereafter, and after the correct frequency has been established, the tube may be filled with a fluid having characteristics suitable to the particular frequency.

Although the invention has been described with relation to a particular square case galvanometer as described in my copending applications, it is apparent that it will find use in any galvanometers of this type regardless of design.

I claim:

1. A damping sleeve for a galvanometer having a coil suspended between the poles of a magnet by upper and lower suspension means, the damping sleeve comprising a first tube adapted to be stationarily mounted around the coil between the poles of the magnet, a second tube fitting over the lower end of the first tube and affixed thereto, a flexible diaphragm disposed across the bottom end of the second tube and sealed around the lower suspension means at a point above the lower end thereof, and a fluid disposed in the tubes.

2. A damping sleeve for a galvanometer having a coil suspended between the poles of a magnet by upper and lower suspension means, the damping sleeve comprising a first tube adapted to be stationarily mounted around the coil between the poles of the magnet, a second tube fitting over the lower end of the first tube and affixed thereto, a rigid diaphragm disposed across the bottom end of the second tube and sealed around the lower suspension means at a point above the lower end thereof, and a fluid disposed in the tubes.

3. A damping sleeve for a galvanometer having a coil suspended between the poles of a magnet by means of upper and lower suspension means, the damping sleeve comprising a first tube adapted to be stationarily mounted around the coil between the poles of the magnet, a second tube fitting over the lower end of the first tube and affixed thereto, a rigid diaphragm disposed across the lower end of the second tube and sealed around the lower suspension means at a point above the lower end thereof, the second tube being affixed to the first tube in such longitudinal relationship that the rigid diaphragm establishes the frequency response of the galvanometer at approximately a pre-selected value, and a fluid disposed in the tubes.

4. A damping sleeve for a galvanometer having a coil suspended in a case between upper and lower suspension means comprising a first tube adapted to be stationarily mounted around the coil within the case, a second tube fitting over the lower end of the first tube and affixed thereto, means sealing the end of the second tube at a point above the lower end of the lower suspension means, and having the lower suspension means sealed therethrough, and a fluid disposed in the tubes, the viscosity-temperature-co-efficient of the fluid being in the range between 135 centistokes for galvanometers having a frequency response of approximately 100 cycles per second to about 1100 centistokes for galvanometers having a frequency response of approximately 3300 cycles per second.

5. In a galvanometer having a wire coil suspended by upper and lower wire strands between the poles of a magnet and enclosed in a case, a damping sleeve comprising a first tube mounted within the case around the coil and open at its top and bottom, a second tube mounted over the lower end of the first tube and extending beyond the end of the first tube, and means closing the lower end of the second tube and sealed around the lower wire strand at a point above the lower end thereof, the first and second tubes being filled with a fluid to damp the movement of the coil.

6. In a galvanometer having a wire coil suspended by upper and lower wire strands between the poles of a magnet and enclosed in a case, a damping sleeve comprising a first tube mounted within the case around the coil and open at its top and bottom, a second tube mounted over the lower end of the first tube and extending beyond the lower end of the first tube, a rigid diaphragm affixed across the lower end of the second tube and sealed around the lower wire strand at a point above the lower end thereof, and means for sealing the second tube to the first tube, the first and second tubes being filled with a fluid to damp the movement of the coil.

7. In a galvanometer having a wire coil suspended by upper and lower wire strands between the poles of a magnet and enclosed in a case, a damping sleeve comprising a first tube mounted within the case around the coil and open at its top and bottom, a second tube mounted over the lower end of the first tube and extending beyond the lower end of the first tube, a flexible diaphragm affixed across the lower end of the second tube and sealed around the lower wire strand at a point above the lower end thereof, and means for sealing the second tube to the first tube, the first and second tubes being filled with a fluid to damp the movement of the coil.

8. In a galvanometer having a wire coil suspended by upper and lower wire strands between the poles of a magnet and enclosed in a case, a damping sleeve comprising a first tube mounted within the case around the coil and extending beyond the coil at both ends, a second tube mounted over the lower end of the first tube and extending beyond the end of the first tube, a diaphragm closing the lower end of the second tube and sealed around the lower wire strand, the second tube being affixed to the first tube in such longitudinal relationship that the diaphragm establishes the frequency response of the galvanometer approximately at a pre-selected value, the first and second tubes being filled with a fluid to damp the movement of the coil.

9. In a galvanometer having a wire coil suspended between the poles of a magnet by upper and lower wire strands and enclosed in a case, a damping sleeve comprising a first tube rigidly held within the case around the coil and open at its top and bottom, a second tube mounted over the lower end of the first tube and extending beyond the end of the first tube, means closing the lower end of the second tube and sealed around the lower wire strand, a port in the wall of the second tube adjacent the lower end thereof and means for sealing the first tube to the second tube, the first and second tubes being filled with a fluid to damp the movement of the coil.

10. In a galvanometer having a wire coil suspended by means of upper and lower suspension wires between the poles of a magnet and enclosed in a case, and frequency control means slidable in the case and adapted to engage the lower suspension wire to establish the frequency of the galvanometer, a damping sleeve comprising a first tube mounted within the case around the coil, the first tube being open at its top and bottom and extending beyond the coil at both ends, a second tube mounted over the lower end of the first tube and extending beyond the end of the first tube, a diaphragm closing the lower end of the second tube and sealed around the lower suspension wire above the frequency control means, and means for sealing the first tube to the second tube, the first and second tubes being filled with a fluid to damp the movement of the coil.

11. In a galvanometer having a wire coil suspended by means of upper and lower suspension wires between the poles of a magnet and enclosed in a case, and frequency control means slidable in the case and adapted to engage the lower suspension wire to establish the frequency of the galvanometer, a damping sleeve comprising a first tube mounted within the case around the coil, a second tube mounted over the lower end of the first tube and extending beyond the lower end of the first tube, a flexible diaphragm closing the lower end of the second tube and sealed around the lower suspension wire above the frequency control means, and means for sealing the first tube to the second tube in such longitudinal relationship that the flexible diaphragm cooperates with the frequency control means to establish the frequency response of the galvanometer, the first and second tubes being filled with a fluid to damp the movement of the coil.

12. A damping sleeve for a galvanometer having a coil suspended between the poles of a magnet by upper and lower suspension wires, the damping sleeve comprising a first tube adapted to be stationarily mounted around the coil between the poles of the magnet, a second tube fitting over the lower end of the first tube and affixed thereto, a rigid diaphragm disposed across the bottom end of the second tube and sealed around the lower suspension wire at a point above the lower end thereof, the tubes being filled with a fluid having a viscosity-temperature-co-efficient approximately equal to X where $$X = \frac{y + 347}{3.32}$$

and $y$ is the frequency response of the galvanometer.

13. In a galvanometer having a wire coil suspended by upper and lower wire strands between the poles of a magnet and enclosed in a case, a damping sleeve comprising a first tube mounted within the case around the coil and open at its top and bottom, a second tube mounted over the lower end of the first tube and extending beyond the lower end of the first tube, a flexible diaphragm affixed across the lower end of the second tube and sealed around the lower wire strand at a point above the lower end thereof, and means for sealing the second tube to the first tube, the first and second tubes being filled with a fluid having a viscosity-temperature-co-efficient approximately equal to X where $$X = \frac{y+347}{3.32}$$

and $y$ is the frequency response of the galvanometer.

14. In a galvanometer having a wire coil suspended by upper and lower suspension wires between the poles of a magnet and enclosed in a case, the combination of a damping sleeve comprising a first tube mounted around the coil, a second tube mounted over the lower end of the first tube, a flexible diaphragm affixed across the lower end of the second tube and sealed around the lower suspension wire at a point above the lower end thereof, the tubes being filled with a damping fluid, and means slidably mounted in the core below the diaphragm and engaging the lower suspension wire to cooperate with the diaphragm to fix the frequency response of the galvanometer.

ARTHUR D. RICHARDSON.

References Cited in the file of this patent

UNITED STATES PATENTS

| Number | Name | Date |
|---|---|---|
| 1,616,754 | Mechau | Feb. 8, 1927 |
| 1,728,555 | Legg | Sept. 17, 1929 |
| 2,024,966 | Chilowsky | Dec. 17, 1935 |
| 2,137,188 | Whitman | Nov. 15, 1938 |
| 2,425,407 | Washburn | Aug. 12, 1947 |
| 2,519,689 | Morrow | Aug. 22, 1950 |